(12) United States Patent
Bi et al.

(10) Patent No.: US 11,453,130 B2
(45) Date of Patent: Sep. 27, 2022

(54) ROBOT SYSTEM

(71) Applicant: Dalian Newstar Automobile Equipment Co., Ltd., Dalian (CN)

(72) Inventors: Kedong Bi, Dalian (CN); Chaoping Qin, Dalian (CN); Long Cui, Dalian (CN); Wentao Li, Dalian (CN)

(73) Assignee: DALIAN NEWSTAR AUTOMOBILE EQUIPMENT CO., LTD., Dalian (CN)

( * ) Notice: Subject to any disclaimer, the term of this patent is extended or adjusted under 35 U.S.C. 154(b) by 313 days.

(21) Appl. No.: 16/914,452

(22) Filed: Jun. 28, 2020

(65) Prior Publication Data
US 2020/0324417 A1 Oct. 15, 2020

Related U.S. Application Data

(63) Continuation-in-part of application No. PCT/CN2018/105676, filed on Sep. 14, 2018.

(30) Foreign Application Priority Data

Dec. 29, 2017 (CN) .......................... 201711474469.9

(51) Int. Cl.
*B25J 11/00* (2006.01)
*G06T 7/80* (2017.01)
(Continued)

(52) U.S. Cl.
CPC .......... *B25J 11/0075* (2013.01); *B05B 12/122* (2013.01); *B05B 13/0431* (2013.01); *B25J 9/08* (2013.01); *B25J 9/102* (2013.01); *B25J 9/1664* (2013.01); *B25J 9/1697* (2013.01); *B25J 13/089* (2013.01); *B25J 15/0019* (2013.01); *B25J 19/0075* (2013.01); *G06T 5/002* (2013.01); *G06T 7/0004* (2013.01); *G06T 7/73* (2017.01);
(Continued)

(58) Field of Classification Search
CPC ................... A61H 3/061; A61H 3/068; G06T 2207/10016; G06T 2201/10028
See application file for complete search history.

(56) References Cited

U.S. PATENT DOCUMENTS 8,731,719 B2 * 5/2014 Franzius ............... G06K 9/6232
382/285
8,745,194 B2 * 6/2014 Uribe-Etxebarria Jimenez ..........
H04L 41/50
709/223
(Continued)

*Primary Examiner* — Yosef Kassa
(74) *Attorney, Agent, or Firm* — Matthias Scholl P.C.; Matthias Scholl

(57) ABSTRACT

A robot system, including: a robot; a base supporting the robot; a controller connected to the robot; a processor connected to the controller; a depth camera connected to the processor; a flange plate; a coupling shaft including a first end and a second end; a mounting base including an elongated hole, a first side wall, and a second side wall; a sprayer including a mounting shaft; a first positioning bolt; a limit arm includes a first end and a second end; an axis pin; a limit shaft; a second positioning bolt; a gas cylinder; a piston rod; a connector; a shifter level; a trigger. The robot is connected to the first end of the coupling shaft via the flange plate. The second end of the coupling shaft is connected to the mounting base. The mounting shaft of the sprayer is disposed in the elongated hole of the mounting base.

6 Claims, 3 Drawing Sheets

(51) Int. Cl.
*G06T 7/73* (2017.01)
*B05B 12/12* (2006.01)
*B05B 13/04* (2006.01)
*B25J 9/08* (2006.01)
*B25J 9/10* (2006.01)
*B25J 9/16* (2006.01)
*B25J 13/08* (2006.01)
*B25J 15/00* (2006.01)
*B25J 19/00* (2006.01)
*G06T 5/00* (2006.01)
*G06T 7/00* (2017.01)
*G06T 17/00* (2006.01)

(52) U.S. Cl.
CPC ............... *G06T 7/80* (2017.01); *G06T 17/00* (2013.01); *G06T 2207/10028* (2013.01)

(56) References Cited

U.S. PATENT DOCUMENTS

| | | | |
|---|---|---|---|
| 9,155,675 B2* | 10/2015 | Ye | A61H 3/061 |
| 9,269,051 B2* | 2/2016 | Guo | G06F 16/24578 |
| 9,420,265 B2* | 8/2016 | Taguchi | G06T 7/00 |
| 10,749,472 B2* | 8/2020 | Rocheleau | H03H 9/02393 |

\* cited by examiner

ROBOT SYSTEM

CROSS-REFERENCE TO RELATED APPLICATIONS

This application is a continuation-in-part of International Patent Application No. PCT/CN2018/105676 with an international filing date of Sep. 14, 2018, designating the United States, and further claims foreign priority benefits to Chinese Patent Application No. 201711474469.9 filed Dec. 29, 2017. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to a painting device, and more particularly to a robot system.

Known methods of painting for a vehicle body include manual painting or automatic painting by robots. The manual painting is mainly used for the automobile maintenance, but it is costly, inefficient, and harmful to the health of the operators. The automatic painting by robots is widely used in the automobile production line but is not suitable for automobile maintenance.

SUMMARY

The disclosure provides a robot system comprising a robot; a base supporting the robot; a controller connected to the robot; a processor connected to the controller; a depth camera connected to the processor; a flange plate; a coupling shaft comprising a first end and a second end; a mounting base comprising an elongated hole, a first side wall, and a second side wall; a sprayer comprising a mounting shaft; a first positioning bolt; a limit arm comprising a first end and a second end; an axis pin; a limit shaft; a second positioning bolt; a gas cylinder; a piston rod; a connector; a shifter level; and a trigger.

The robot is connected to the first end of the coupling shaft via the flange plate; the second end of the coupling shaft is connected to the mounting base; the mounting shaft of the sprayer is disposed in the elongated hole of the mounting base; the first positioning bolt is secured to the first side wall of the mounting base to position the mounting shaft of the sprayer on the first side wall; the second side wall of the mounting base is rotatably connected to the first end of the limit arm via the axis pin; the second end of the limit arm is connected to the limit shaft; the limit shaft supports the mounting shaft of the sprayer; the second positioning bolt is disposed between a middle part of the limit arm and the mounting base; the gas cylinder connecting to a pneumatic device is fixedly disposed on the mounting base; the piston rod is cooperative with the gas cylinder and is connected to the shifter level via the connector; the poke rod is cooperative with the trigger disposed on the sprayer.

The depth camera is configured to acquire a three-dimensional point cloud model of a to-be-maintained area of a vehicle and transmit data associated with the three-dimensional point cloud model to the processor; the processor is configured to denoise and smooth the data associated with the three-dimensional point cloud model, extract feature points of the data through a set of algorithms, calculate a movement track of the robot, calibrate a relative position relationship between a coordinate system of the depth camera and a coordinate system of the robot, and control the robot to move at a constant speed along the movement track.

The robot can be an intelligent modular robot.

The robot can be an explosion-proof robot comprising an explosion-proof joint; the explosion-proof joint comprises a housing, a motor, a reducer, a first spacer flange, a second spacer flange, and an oil seal disposed between the first spacer flange and the second spacer flange; the motor and the reducer are disposed in the housing; the housing comprises a first housing, a second housing comprising a first end and a second end, and a third housing; the first housing comprises an end face fixedly connected to the first spacer flange; a first seal ring is disposed between the first housing and the first spacer flange; a dust ring is wrapped around the first spacer flange; the second spacer flange comprises a first side fixedly connected to one end of the dust ring, and a second side fixedly connected to the first end of the second housing; a second seal ring is disposed between the second housing and the second spacer flange; the third housing is fixedly connected to the second end of the second housing; and a third seal ring is disposed between the second housing and the third housing.

DETAILED DESCRIPTION

To further illustrate the invention, embodiments detailing a robot system are described below. It should be noted that the following embodiments are intended to describe and not to limit the disclosure.

Figure 1:
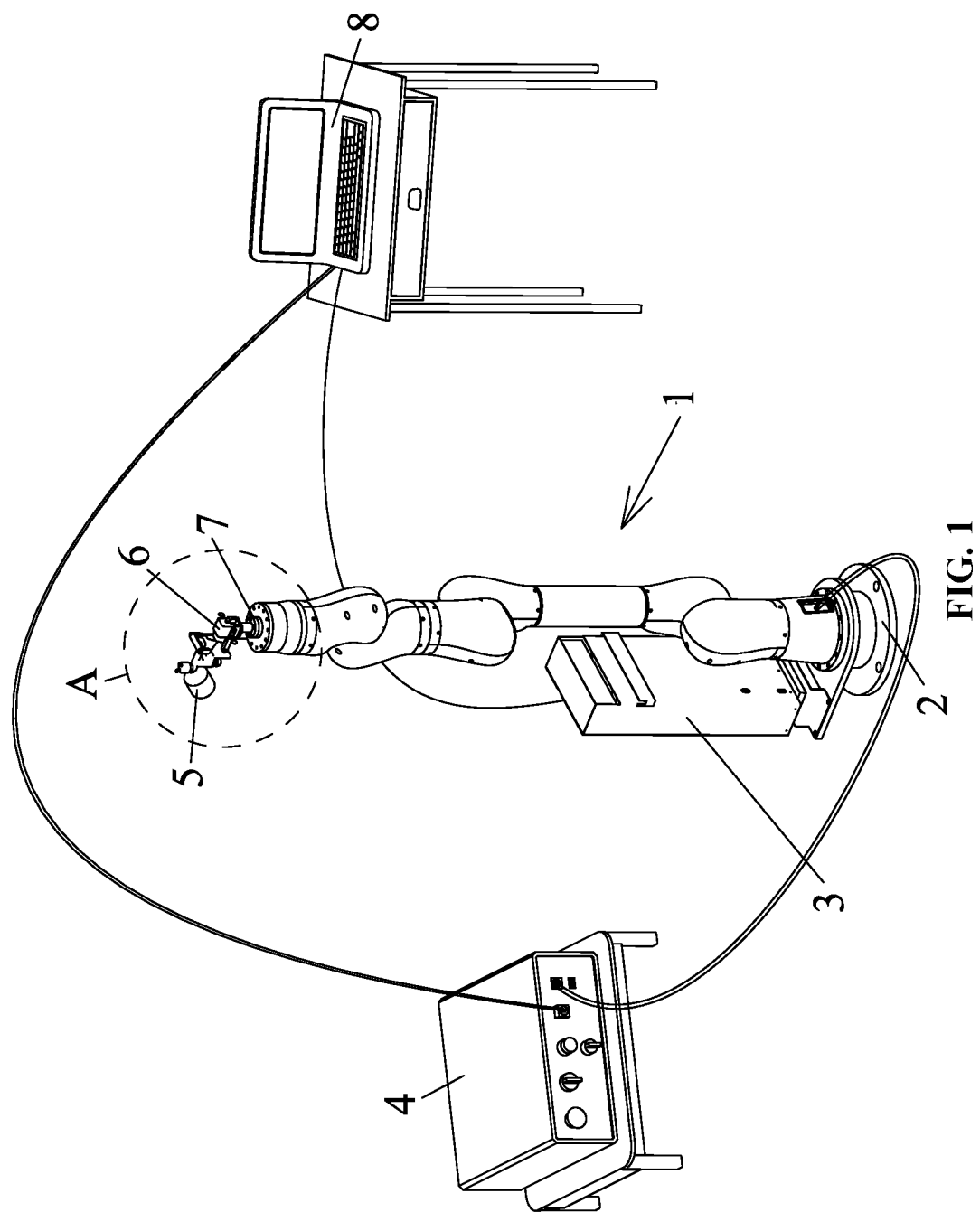
FIG. 1 is a schematic diagram of a robot system according to one embodiment of the disclosure.
Figure 2:
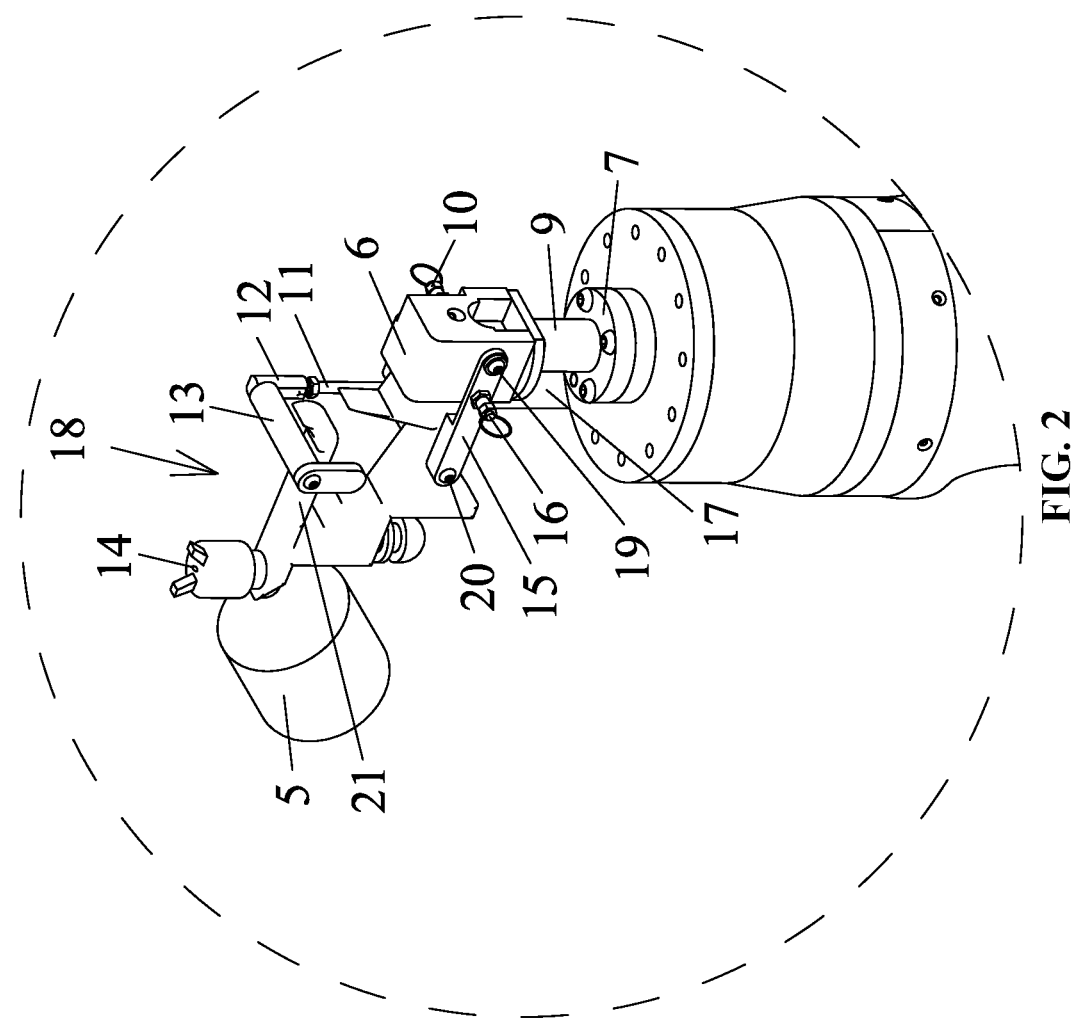
FIG. 2 is a local enlarge view of part A in FIG. 1.

As shown in FIG. 1 and FIG. 2, the disclosure provides a robot system, comprising a robot 1 and a base 2 supporting the robot 1. The robot 1 is an intelligent modular robot and is fixedly disposed on the base via anchor bolts.

A controller 4 is connected to the robot 1; a processor 8 is connected to the controller 4; and a depth camera 3 is connected to the processor 8.

The upper part of the robot 1 is connected to the first end of the coupling shaft 9 via a flange plate 7; the second end of the coupling shaft 9 is connected to a mounting base 6 comprising an elongated hole.

The mounting shaft of a sprayer 18 is connected to a paint container 5 and disposed in the elongated hole of the mounting base 6. A first positioning bolt 10 is secured to a first side wall of the mounting base 6 to position the mounting shaft of the sprayer 18 on the first side wall. The first positioning bolt 10 is in threaded connection to the mounting base 6. The inner end of the first positioning bolt 10 is embedded into a pit on the mounting shaft of the sprayer 18, and the mounting shaft of the sprayer 18 can rotate with respect to the mounting base 6. A second side wall of the mounting base 6 is rotatably connected to the first end of the limit arm 15 via the axis pin 19; the second end of the limit arm 15 is connected to the limit shaft 20. The limit shaft 20 supports the mounting shaft of the sprayer 18, thus supporting the entire structure of the sprayer 18. A second positioning bolt 16 is disposed between the middle part of the limit arm 15 and the mounting base 6. The inner end of the second locating bolt 16 is embedded into a groove on the second side wall of the mounting base 6, so that the limit arm 15 is fixed with respect to the mounting base 6. The second locating bolt 16 is equipped with a return spring. When the second locating bolt 16 is pulled apart by an external force, the spring force of the return spring is overcome, so that the inner end of the second locating bolt 16 leaves the groove on the second side wall of the mounting base 6. When the external force is removed, under the action of the return spring, the inner end of the second positioning bolt 16 automatically returns into the groove on the second side wall of the mounting base 6. The limit arm 15 supports the sprayer 18 through the limit shaft 20. When the second positioning bolt 16 is pulled apart, the support for the sprayer 18 is released, and the sprayer 18 can swing relative to the mounting base 6.

The gas cylinder 17 connecting to a pneumatic device is fixedly disposed on the mounting base 6; a piston rod 11 is cooperative with the gas cylinder 17 and is connected to a shifter level 13 via a connector 12; the poke rod 13 is cooperative with a trigger 21 disposed on the sprayer 18. When the gas cylinder 17 drives the poke rod 13 to retract, the trigger 21 is pressed via the poke rod 13, so that the ejector 14 of the sprayer 18 starts to spray paint. The sprayer 18 is a common manual paint spraying device. The robot 1 is an intelligent modular robot, and also an explosion-proof robot. When the robot 1 works, the air can enter the joint to ensure the explosion-proof operation of the robot system.

Figure 3:
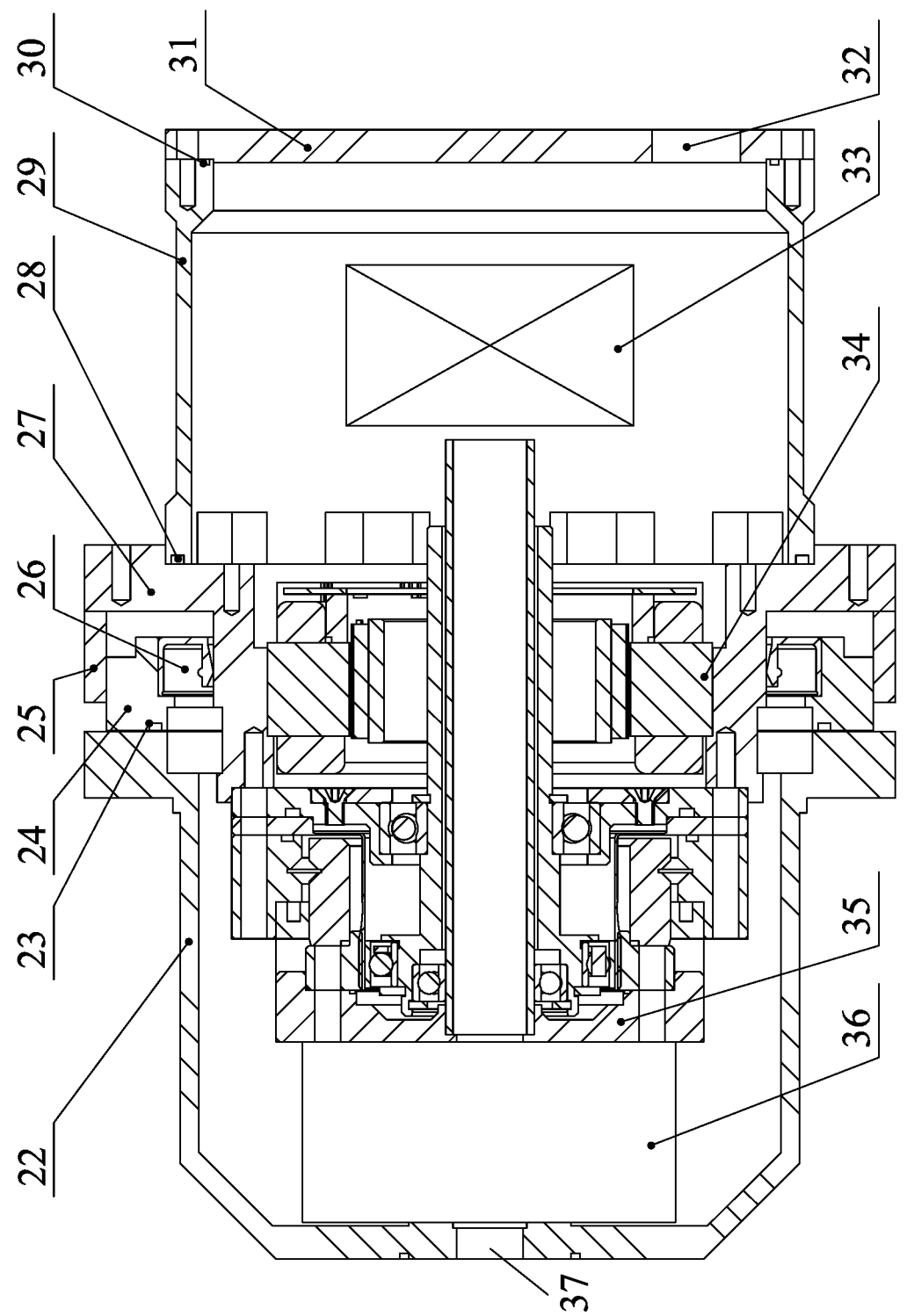
FIG. 3 is a schematic diagram of a joint of a robot system according to one embodiment of the disclosure.

As shown in FIG. 3, the explosion-proof robot comprises an explosion-proof joint; the explosion-proof joint comprises a housing, a motor 34, a reducer 35, a third flange 36, and an electronic control element 33; the motor 34, the reducer 35, the third flange 36, and the electronic control element 33 are disposed in the housing; the housing comprises a first housing 22, a second housing 29 comprising a first end and a second end, and a third housing 31; the first housing 22 comprises an end face fixedly connected to a first spacer flange 24; a first seal ring 23 is disposed between the first housing 22 and the first spacer flange 24; a dust ring 25 is wrapped around the first spacer flange 24; one end of the dust ring 25 is fixedly connected to a first side of a second spacer flange 27, and a second side of the second spacer flange 27 is fixedly connected to the first end of the second housing 29; an oil seal 26 is disposed between the first spacer flange 24 and the second spacer flange 27; a second seal ring 28 is disposed between the second housing 29 and the second spacer flange 27; the third housing 31 is fixedly connected to the second end of the second housing 29; and a third seal ring 30 is disposed between the second housing 29 and the third housing 31. The explosion-proof joint further comprises a positive pressure air inlet 32 disposed on the third housing 31 and an air outlet 37 disposed on the first housing 22.

The working principle of the robot system is detailed as follows. The depth camera is disposed on the base of the robot. First, the depth camera 3 acquires a three-dimensional point cloud model of a to-be-maintained area of a vehicle and transmits the data associated with the three-dimensional point cloud model to the processor 8; the processor 8 preprocesses the three-dimensional point cloud data, such as denoising and smoothing, extracts the feature points of the three-dimensional point cloud data through a set of algorithms, calculates the movement track of the robot and calibrates the relative position relationship between the coordinate system of the depth camera and the coordinate system of the robot 1 (i.e. unified coordinate system), and finally controls the robot to move at a constant speed along the movement track; and the controller 4 controls the pneumatic device to drive the cylinder 17 and the trigger 21 to complete the painting.

The robot system of the disclosure can meet the requirements of painting for automobile maintenance, achieves the same technical effect as that by manual painting, thus ensuring the painting quality and improving the working efficiency. When used in a 4S shop, the robot system can improve the painting efficiency and accuracy, reduce the labor intensity of the operators, and ensure the physical health of the operator.

It will be obvious to those skilled in the art that changes and modifications may be made, and therefore, the aim in the appended claims is to cover all such changes and modifications.

What is claimed is:

1. A robot system, comprising:
   1) a robot;
   2) a base supporting the robot;
   3) a controller connected to the robot;
   4) a processor connected to the controller;
   5) a depth camera connected to the processor;
   6) a flange plate;
   7) a coupling shaft comprising a first end and a second end;
   8) a mounting base comprising an elongated hole, a first side wall, and a second side wall;
   9) a sprayer comprising a mounting shaft;
   10) a first positioning bolt;
   11) a limit arm comprises a first end and a second end;
   12) an axis pin;
   13) a limit shaft;
   14) a second positioning bolt;
   15) a gas cylinder;
   16) a piston rod;
   17) a connector;
   18) a shifter level; and
   19) a trigger;
   wherein
   the robot is connected to the first end of the coupling shaft via the flange plate; the second end of the coupling shaft is connected to the mounting base;
   the mounting shaft of the sprayer is disposed in the elongated hole of the mounting base;
   the first positioning bolt is secured to the first side wall of the mounting base to position the mounting shaft of the sprayer on the first side wall;
   the second side wall of the mounting base is rotatably connected to the first end of the limit arm via the axis pin; the second end of the limit arm is connected to the limit shaft;
   the limit shaft supports the mounting shaft of the sprayer;
   the second positioning bolt is disposed between a middle part of the limit arm and the mounting base;
   the gas cylinder is connected to a pneumatic device and is fixedly disposed on the mounting base; and
   the piston rod is cooperative with the gas cylinder and is connected to the shifter level via the connector; the poke rod is cooperative with the trigger disposed on the sprayer.

2. The robot of claim 1, wherein the depth camera is configured to acquire a three-dimensional point cloud model of a to-be-maintained area of a vehicle and transmit data associated with the three-dimensional point cloud model to the processor; the processor is configured to denoise and smooth the data associated with the three-dimensional point cloud model, extract feature points of the data through a set of algorithms, calculate a movement track of the robot, calibrate a relative position relationship between a coordinate system of the depth camera and a coordinate system of the robot, and control the robot to move at a constant speed along the movement track.

3. The robot of claim 1, wherein the robot is an intelligent modular robot.

4. The robot of claim 2, wherein the robot is an intelligent modular robot.

5. The robot of claim 1, wherein the robot is an explosion-proof robot; the explosion-proof robot comprises an explosion-proof joint; the explosion-proof joint comprises a housing, a motor, a reducer, a first spacer flange, a second spacer flange, and an oil seal disposed between the first spacer flange and the second spacer flange; the motor and the reducer are disposed in the housing; the housing comprises a first housing, a second housing comprising a first end and a second end, and a third housing; the first housing comprises an end face fixedly connected to the first spacer flange; a first seal ring is disposed between the first housing and the first spacer flange; a dust ring is wrapped around the first spacer flange; the second spacer flange comprises a first side fixedly connected to one end of the dust ring, and a second side fixedly connected to the first end of the second housing; a second seal ring is disposed between the second housing and the second spacer flange; the third housing is fixedly connected to the second end of the second housing; and a third seal ring is disposed between the second housing and the third housing.

6. The robot of claim 2, wherein the robot is an explosion-proof robot; the explosion-proof robot comprises an explosion-proof joint; the explosion-proof joint comprises a housing, a motor, a reducer, a first spacer flange, a second spacer flange, and an oil seal disposed between the first spacer flange and the second spacer flange; the motor and the reducer are disposed in the housing; the housing comprises a first housing, a second housing comprising a first end and a second end, and a third housing; the first housing comprises an end face fixedly connected to the first spacer flange; a first seal ring is disposed between the first housing and the first spacer flange; a dust ring is wrapped around the first spacer flange; the second spacer flange comprises a first side fixedly connected to one end of the dust ring, and a second side fixedly connected to the first end of the second housing; a second seal ring is disposed between the second housing and the second spacer flange; the third housing is fixedly connected to the second end of the second housing; and a third seal ring is disposed between the second housing and the third housing.

* * * * *